United States Patent [19]

Jain et al.

[11] Patent Number: 4,973,435

[45] Date of Patent: Nov. 27, 1990

[54] METHOD OF PRODUCING POROUS MEMBRANES OF SINTERABLE REFRACTORY METAL OXIDES

[75] Inventors: Mukesh K. Jain; Sadashiv K. Nadkarni, both of Jonquiere, Canada

[73] Assignee: Alcan International Limited, Montreal, Canada

[21] Appl. No.: 265,690

[22] Filed: Nov. 1, 1988

[30] Foreign Application Priority Data

Nov. 3, 1987 [CA] Canada ................................. 550959

[51] Int. Cl.$^5$ ............................................. B28B 1/50
[52] U.S. Cl. .................................... 264/29.6; 264/43; 264/44
[58] Field of Search ....................... 264/29.1, 29.6, 44, 264/43, 63, 65

[56] References Cited

U.S. PATENT DOCUMENTS

| | | |
|---|---|---|
| 1,344,153 | 6/1920 | Shoeld ................................. 423/412 |
| 2,797,201 | 6/1957 | Veatch et al. ....................... 521/57 |
| 2,799,912 | 7/1957 | Greger ................................. 423/440 |
| 2,806,509 | 9/1957 | Bozzacco et al. ................... 521/54 |
| 3,436,174 | 4/1969 | Matsuo et al. ...................... 423/412 |
| 3,615,972 | 10/1971 | Morehouse, Jr. .................... 521/59 |
| 3,792,136 | 2/1974 | Schmitt ............................... 264/44 |
| 3,873,475 | 3/1975 | Pechacek et al. ................... 521/55 |
| 3,914,360 | 10/1975 | Gunderman et al. ................ 521/56 |
| 4,104,345 | 8/1978 | Anderson et al. ................... 264 X/63 |
| 4,126,652 | 10/1978 | Oohara et al. ...................... 423/440 |
| 4,191,721 | 3/1980 | Pasco et al. ........................ 264/44 X |
| 4,247,500 | 1/1981 | Dixon et al. ........................ 264/63 |
| 4,256,676 | 3/1981 | Kovach ............................... 264/29.4 X |
| 4,283,360 | 8/1981 | Henmi et al. ....................... 264/63 |
| 4,284,612 | 8/1981 | Horne et al. ........................ 423/345 |
| 4,327,192 | 4/1982 | Henderson et al. ................. 521/53 |
| 4,504,453 | 3/1985 | Tanaka et al. ...................... 423/345 |
| 4,536,379 | 8/1985 | Carlson et al. ..................... 423/345 |
| 4,591,497 | 5/1986 | Tanaka et al. ...................... 423/345 |
| 4,615,863 | 10/1986 | Inoue et al. ........................ 501/96 X |
| 4,618,582 | 10/1986 | Kiromoto et al. .................. 423/412 |
| 4,652,436 | 3/1987 | Kato .................................... 423/412 |
| 4,670,407 | 6/1987 | Kiehl et al. ......................... 501/98 X |
| 4,680,153 | 7/1987 | Kinder et al. ...................... 264/29.6 X |
| 4,686,244 | 8/1987 | Dietlein et al. ..................... 521/179 |
| 4,752,456 | 6/1988 | Yoda et al. ......................... 423/346 |

(List continued on next page.)

FOREIGN PATENT DOCUMENTS

| | | | |
|---|---|---|---|
| 1076009 | 5/1957 | Fed. Rep. of Germany ...... 423/412 |
| 1188046 | 9/1958 | Fed. Rep. of Germany ...... 423/412 |
| 55-159946 | 2/1980 | Japan .................................. 423/406 |
| 5492629 | 2/1981 | Japan . | |
| 60-176910 | 3/1985 | Japan .................................. 423/412 |
| 60-177198 | 9/1985 | Japan . | |
| 61-71804 | 4/1986 | Japan . | |
| 61-155260 | 7/1986 | Japan .................................. 423/412 |

OTHER PUBLICATIONS

Futuretech ® 38, Jul. 27, 1987.
Hoch et al, "Preparation and Characterization of Ultra- (List continued on next page.)

*Primary Examiner*—Jan H. Silbaugh
*Assistant Examiner*—Christopher A. Fiorilla
*Attorney, Agent, or Firm*—Cooper & Dunham

[57] ABSTRACT

Porous membranes made of sintered refractory metal oxides, e.g., silica aluimina, titania, zirconia, tungsten oxide, etc., and to a process for their formation. The membranes are formed by dispersing a powder of the metal oxide in an organic polymer. The relative amount of metal oxide to polymer is such that, after the polymer has been carbonized in a subsquent step, there is a stoichiometrical excess of the oxide to carbon. The solution is then shaped to form a desired thin membrane, and the polymer is then carbonized by heating it in a non-oxidizing atmosphere. The resulting oxide/carbon product is heated to a temperature at which (a) the carbon reacts with the oxide to form a volatile sub-oxide and carbon monoxide and (b) the remaining (unreacted) oxide particles sinter together. The heating is carried out in a non-oxidizing atmosphere containing either no nitrogen whatsoever, or an amount of nitrogen less than that which results in the formation of a non-porous product. The sintered membranes can be used, for example, as filters and catalyst supports and have good strength and controlled porosity.

1 Claim, 2 Drawing Sheets

U.S. PATENT DOCUMENTS

| | | | |
|---|---|---|---|
| 4,780,299 | 10/1988 | Kumagai et al. | 423/412 |
| 4,784,839 | 11/1988 | Bachelard et al. | 423/412 X |
| 4,851,205 | 7/1989 | Mitomo | 501/98 X |
| 4,857,246 | 8/1989 | Bolt | 269/29.2 |

OTHER PUBLICATIONS fine Powders of Refractory Nitrides; 1, AlN and $Si_3N_4$," Am. Ceram. Soc. Bull. (U.S.A.), vol. 58, No. 2 (1979), pp. 187–190.

Iwama et al, "Ultrafine Powders of TiN and AlN Produced by a Reactive Gas Evaporation Technique with Electron Beam Heating," Journal of Crystal Growth, 56 (1982), 265–269, North-Holland Publishing Company.

Abstract J58045197, High Qualtiy Silicon Carbide Whiskers Mfr.

Silicon Carbide Fiber and Its Production, Abstract 83-223698.

Abstract 83-045197, Mfr. of High Quality Silicon Carbide Whiskers.

METHOD OF PRODUCING POROUS MEMBRANES OF SINTERABLE REFRACTORY METAL OXIDES

BACKGROUND OF THE INVENTION

I. Field of the Invention

This invention relates to porous membranes made of sintered refractory metal oxides, e.g. alumina, titania, zirconia, tungsten oxide, and silica, and to a process for forming such membranes.

II. Description of the Prior Art

Thin porous membranes made of high temperature-resistant ceramic materials, such as those mentioned above, are useful for a variety of purposes. For example, they may be used as high temperature filters or as catalyst supports. Sintered products of this type can be produced by heating, to the sintering temperature, a shaped product made of particles of the ceramic material loosely held together. However, it is often difficult to control the porosity of the products by such procedures and thin membranes are difficult to produce because the product is subject to cracking.

Ceramic membranes with micron sized pores are most commonly prepared by sol-gel techniques, e.g. as disclosed in Futuretech, 38, July 27, 1987, p 9 (published by Technical Insights, Inc., Englewood, NJ, USA). Another method of making membranes having angstrom sized pores is by anodic oxidation of aluminum or aluminum alloys, e.g. as disclosed in Japanese published patent application (Kokai) No. 61 71804 to Toyo Soda Mfg. Co. Ltd. of April 12, 1986 and in Japanese published patent application (Kokai) No. 60 177,198 to Nippon Sheet Glass Co. Ltd. of September 11, 1985.

SUMMARY OF THE INVENTION

An object of the present invention is thus to provide an improved process for producing thin porous membranes made of ceramic materials.

The present invention is based on the finding that sintered porous structures can be produced by starting from a dispersion of fine particles of the metal oxide in a suitable polymer. Moreover, by employing a non-oxidizing atmosphere in the final step, coupled with a stoichiometrical excess of the oxide particles relative to the carbon derived from the polymer, a sintered structure of controlled porosity can be obtained in a relatively simple and effective manner.

According to the invention there is provided a process for producing porous membranes made of a metal oxide, said process comprising: dispersing a powder comprising particles of a metal oxides in an organic polymer, wherein the amount of the metal oxide employed is in excess of an amount which reacts in a subsequent heating step with carbon derived from the polymer; shaping the dispersion to form a desired thin shape; carbonizing the polymer by heating it in a non-oxidizing atmosphere; heating the resulting product in a non-oxidizing atmosphere containing either no nitrogen whatsoever, or an amount of nitrogen less than that which results in the formation of a non-porous product, to a temperature at which the carbon reacts with some of the oxide while the remaining unreacted oxide particles sinter together.

The invention also relates to porous membranes produced by the process mentioned above.

DETAILED DESCRIPTION OF THE INVENTION

Figure 1:
FIG. 1 is a photomicrograph showing the outside surface of a sintered alumina tube at 80 x magnification.

Either individual metal oxides may be used in the invention, or alternatively mixtures of two or more metal oxides, may be used.

The process of the invention is capable of producing porous membranes up to a total thickness of about 5 mm in the form of sheets, strips, hollow tubes or the like.

In the present invention, use is made of the fact that certain metal oxides react with carbon at high temperatures in non-oxidizing atmospheres to form volatile products. For example, alumina reacts with carbon in the following manner.

$$Al_2O_3 + C \rightarrow Al_2O_2 \uparrow + CO \uparrow$$

Both the $Al_2O_2$ (referred to hereinafter as the sub-oxide) and the carbon monoxide are volatile at the reaction temperatures and are consequently driven off from the reacting starting materials. If the ratio of alumina to carbon is high enough that the alumina is in stoichiometrical excess, and if the reaction temperature is also a temperature at which alumina sinters, then some alumina will react with the carbon to leave pores or voids in the remaining excess (unreacted) alumina, and the remaining alumina particles will sinter together to form a porous membrane. By varying the ratio of alumina to carbon, the porosity of the resulting product can be varied and controlled.

During the reaction one weight unit of carbon reacts with approximately 8.5 weight units of alumina, so it can be seen that quite a small amount of carbon is required to produce a membrane product of high porosity. Normally, the weight ratio of alumina to carbon is 10–20:1. The weight ratio of the alumina to the polymer used as the starting material depends on the carbon yield of the polymer, i.e. the weight of carbon produced from a unit weight of the polymer during the carbonization step. Different polymers have different carbon yields but these can be easily determined or are already well known.

The process of the present invention can be carried out not just with alumina but with any refractory metal oxide, or mixture of oxides, which (a) reacts with carbon in a non-oxidizing atmosphere to produce a volatile product (e.g. a sub-oxide) and a gaseous carbon oxide at high temperature, and (b) can be sintered at the reaction temperature. Examples of such metal oxides are silica, zirconia, titania, silica, yttria, tungsten oxide, etc. In fact, oxides of metals of Groups 3 and 4 of the Periodic Table are in general satisfactory. The reactions which some of these oxides undergo are given below:

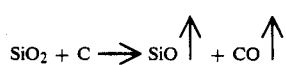

$$SiO_2 + C \rightarrow SiO \uparrow + CO \uparrow$$

-continued

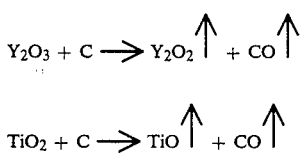

The formation of the corresponding carbides is avoided when the ratio of the oxide to carbon is equal to or more than 1:1 (molar) and the shapes are kept relatively thin.

Although the porosity of the final product depends to some extent on the sintering temperature and time, and on the oxide to carbon ratio, when a product having large voids is desired, the size of the oxide particles should be quite large, e.g about 5–10μ or larger.

However, in order to produce a fine and uniform porosity throughout the membrane product, the oxide particles should be small (e.g. about 5μ in diameter or smaller) and the oxide should be uniformly dispersed within the polymer starting material.

The particles may be dispersed in a melt of the polymer using high torque mixing equipment but, more preferably, the particles are uniformly dispersed within a solution of the organic polymer, and then the solvent is removed from the solution.

The solvent may be removed by evaporation or, more preferably, by so-called "solvent drying" in which the dispersion is introduced into a non-solvent for the polymer which is miscible with the solvent. The solvent is, by this means, extracted from the polymer solution and the polymer coagulates and solidifies without disturbing the uniform dispersion of the oxide particles.

Any suitable organic polymer can be employed as a carbon precursor but those polymers of high carbon yield upon carbonization are preferred. Suitable polymers include polyacrylonitrile and its copolymers and terpolymers (collectively referred to as PAN), cellulose and its derivatives, polyvinyl alcohol and its copolymers and terpolymers, polyethylene glycol, polyarylether, polyacenaphthylene, polyacetylene, and the like. Other suitable materials are disclosed in "Precursors for Carbon and Graphite Fibers" by Daniel J. O'Neil, Intern. J. Polymeric Meter, Vol. 7 (1979), p 203.

PAN is the most preferred material for use in the present invention. PAN is widely used for textiles, for the production of carbon fibres and for other purposes. For example, it is sold under the trade mark ORLON by E. I. DuPont de Nemours and Company, and the structure of this particular product is disclosed in an article by R. C. Houtz, Textile Research Journal, 1950, p. 786. Textile grade PAN is commonly a copolymer of polyacrylonitrile and up to 25% by weight (more commonly up to 10% by weight and usually about 6% by weight) of methacrylate or methylmethacrylate. Textile grade PAN copolymers can be used in the present invention and are in fact preferred to PAN homopolymer because the additional units in the copolymer assist in the cyclization of the polymer when heat stabilization is carried out to make the polymer infusible. Inexpensive waste PAN from the textile industry, such as the so-called "dryer fines", are particularly useful in the invention.

PAN has a carbon yield of about 50% by weight so that the amount of polymer employed should be about twice the amount of carbon required in the oxide/carbon intermediate.

PAN may require a heat stabilization treatment prior to the carbonization step in order to make the polymer infusible and thus to avoid cracking or warping when the carbonization step is carried out. The heat stabilization step causes the PAN polymer to cyclize, e.g. as follows:

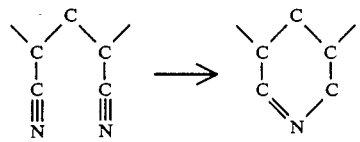

The heat stabilization is carried out by heating the polymer in air or oxygen at a temperature of about 190° to 220° C. for several hours, e.g. up to about 16 hours.

Suitable solvents for PAN include dimethylformamide (DMF), dimethylsulfoxide (DMSO) and dimethylacetamide (DMAc). DMF is the preferred solvent and solutions of the required viscosity can be made by dissolving a sufficient amount of PAN in DMF to give a solution containing 5–20% by weight, more preferably 8–16% by weight, and most preferably 12–15% by weight of PAN.

When cellulose or a cellulose derivative (e.g. the textile material sold under the trademark RAYON) is used as the polymer, a mixture of about 10% by weight of LiCl in DMF may be used as a solvent. It is known that the LiCl acts as a solubilizing aid which increase the solubility of cellulose in DMF. When polyvinylalcohol is used as the polymer, DMF is a suitable solvent. Suitable solvents are also available for the other polymers mentioned above.

When PAN is used as the polymer and DMF is used as the solvent, the non-solvent may be water or methanol. Suitability as a non-solvent for the PAN/DMF system appears to be associated with a high polarity and the presence of —OH groups. Acetone, for example, is not suitable as a non-solvent for the PAN/DMF system because the coagulation or precipitation of the polymer is not sufficiently rapid.

Since water is inexpensive, it is the preferred non-solvent, but 0–80% by weight of the solvent (DMF) may be included in the water.

When the polymer is cellulose or a derivative thereof in a DMF solution containing 10% LiCl, the non-solvent may be water.

For polyvinyl alcohol in DMF methyl ethyl ketone can be used as a non-solvent.

The oxide/polymer intermediate is formed into the shape required for the final product, e.g. by moulding, extrusion, layering etc. When the intermediate is formed by the use of a polymer solution followed by liquid drying, sheets or membranes can be formed by layering the oxide/polymer dispersions on plates (or other flat surfaces) and then dipping the plates into a non-solvent to bring about the liquid drying. If desired, this can be done continuously by spreading the dispersion onto a conveyor and using a doctor blade to spread the dispersion to the required thickness. The conveyor would then move the dispersion layer through a bath of the non-solvent. In the case of tubular products, these can be formed by extruding the dispersion into a bath of the non-solvent through an annular orifice.

Once the oxide/polymer dispersion has been obtained and, if necessary, heat stabilized, it is heated in a non-oxidizing atmosphere (e.g. nitrogen or an inert (noble)

gas such as argon) to a temperature of about 500°–750° C. to cause the polymer to carbonize.

The metal oxide/carbon product is then reacted, either in a separate step or as a continuation of the carbonization step, by heating it to a temperature which (a) causes the reaction between carbon and the oxide to take place and (b) causes sintering (without complete melting) of any unreacted oxide particles. The actual temperatures depend on the type of oxide employed. For alumina they generally range from 1500° C.–2000° C., more usually 1600° C. to 1900° C., and generally 1650° C.–1850° C. For titania, the reaction temperature is 1400° C.–1500° C.

In both the carbonization step and the further heating step, the heating rate should be kept relatively slow to avoid the rapid evolution of volatiles. For example, the oxide/polymer dispersion may be heated at a maximum rate of about 500° C. per hour up to the final sintering temperature in those cases where the carbonization step and the heating (sintering) step are carried out in the same reactor during the same heating procedure.

The heating (sintering) reaction is carried out in an atmosphere of a non-oxidizing gas, e.g. a noble gas, such as argon. If an oxidizing gas, e.g. oxygen or air, were present, clearly the carbon would react preferentially with this rather than with the metal oxide.

As stated above, the porosity of the product can be varied by changing the ratio of the metal oxide to the carbon prior to the reaction, or by varying the particle size of the oxide particles. However, it has also been found that the porosity of the product can also be adjusted by introducing nitrogen into the non-oxidizing atmosphere present during the reaction. When nitrogen is present, the metal oxide reacts with it to form a metal nitride, e.g. via the following reaction scheme:

$$Al_2O_3 + 3C + N_2 \rightarrow 2AlN + 3CO$$

Since the metal nitride is non-volatile, it does not leave the product in the way that the volatile sub-oxide does and hence it does not contribute to the porosity of the product. If an excess amount of nitrogen is present, the alumina which reacts will be completely converted to nitride and so the desired porosity will not be introduced into the product. Accordingly, the amount of nitrogen introduced into the reaction environment should be such that at least some of the metal oxide is converted to the volatile sub-oxide and removed from the product. By varying the amount of nitrogen introduced into the reaction atmosphere up to the limit mentioned above (e.g. up to about 10–20% by volume), the porosity of the resulting product can be correspondingly varied.

Instead of using nitrogen itself, a compound which decomposes to produce nitrogen under the reaction conditions may be employed, for example ammonia or an amine.

If desired, the reaction can be commenced in an atmosphere containing no nitrogen and then nitrogen may be introduced after the product is judged to have developed sufficient porosity. The introduction of the nitrogen in this way will "freeze" the porosity at the desired level.

While the process of the present invention can be used to form membranes up to a thickness of about 5 mm, thicker products are less easy to form because of the need to allow the volatile sub-oxide and oxide of carbon to escape from the solid matrix. When the products are thicker than about 5 mm, they may have a tendency to be non-porous in the centre. Sheets or hollow tubes up to 2 mm in thickness can be produced without difficulty.

The invention is illustrated in further detail with reference to the following Examples.

EXAMPLE 1

A solution of polyacrylonitrile (PAN) obtained from DuPont was dissolved in dimethylformamide (DMF) to form a solution having a solids content of 12% by weight. Alumina particles (produced by the Bayer process by Alcan) having an average particle size of less than 1μ were added to the solution and the solution was vigorously agitated to form a uniform dispersion. The ratio of alumina:PAN was about 6:1 by weight.

The alumina-containing solution was used to form thin films and tubes less than 5mm thick either by using a doctor blade followed by treatment with water (to remove the DMF) or by extruding the dispersion through an annular nozzle into a water bath.

The films and tubes thus formed were stabilized at 210° C. in an air atmosphere and then reacted under an argon atmosphere for 3.5 hours at 1850° C. Thus heating step first carbonized the PAN and then caused some of the alumina to react with the carbon and the remainder to sinter.

The products were porous sheets and tubes of sintered alumina.

EXAMPLE 2

The procedure of Example 1 was repeated in two further tests except that the alumina:PAN ratio was varied as follows:

$Al_2O_3:PAN = 8:1$ $Al_2O_3:PAN = 10:1$

In both cases, acceptable sintered membranes were formed with the porosity decreasing as the relative amount of carbon decreased.

Figure 2:
FIG. 2 is a photomicrograph of the same tube as shown in FIG. 1 but at 1000 x magnification.
Figure 3:
FIG. 3 is a photomicrograph showing the inside surface of the tube of FIG. 1 at 65 x magnification.
Figure 4:
FIG. 4 is a photomicrograph showing a cross-section of the wall of the tube of FIG. 1 at 400 x magnification.

FIGS. 1, 2, 3 and 4 respectively show the outside surface (FIGS. 1 and 2), the inside surface and the wall cross-section of a sintered tube produced using an $Al_2O_3$:PAN ratio of 8:1. The porous sintered structure is very apparent from these figures.

What we claim is:

1. A process for producing porous membranes made of a metal oxide capable of forming a gaseous suboxide, said process comprising:

dispersing a powder comprising particles of said metal oxide in an organic polymer, wherein the amount of the metal oxide employed is in excess of an amount which reacts in a subsequent heating step with carbon derived from the polymer;

shaping the dispersion to form a desired thin shape;

carbonizing the polymer in said dispersion by heating said dispersion in a non-oxidizing atmosphere to convert said polymer to carbon;

heating the product resulting from the carbonizing step first in a non-oxidizing atmosphere containing no nitrogen to a temperature at which the carbon produced during the carbonizing step reacts with some of the oxide to form said gaseous suboxide, while remaining unreacted oxide particles sinter together, and then introducing nitrogen in order to prevent the development of further porosity.

* * * * *